United States Patent
Czachor et al.

(10) Patent No.: US 6,382,905 B1
(45) Date of Patent: May 7, 2002

(54) FAN CASING LINER SUPPORT

(75) Inventors: Robert Paul Czachor; William Carl Ruehr, both of Cincinnati, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/560,460

(22) Filed: Apr. 28, 2000

(51) Int. Cl.⁷ .............................................. F01D 19/00
(52) U.S. Cl. .................... 415/9; 415/128; 415/136; 415/173.2; 415/173.3; 415/173.4
(58) Field of Search ........................... 415/9, 126, 128, 415/136, 173.1, 173.2, 173.3, 173.4, 173.5, 135

(56) References Cited

U.S. PATENT DOCUMENTS

| | | | |
|---|---|---|---|
| 3,423,070 A | * 1/1969 | Corrigan .................. | 415/173.5 |
| 3,656,862 A | * 4/1972 | Rahaim et al. ........... | 415/173.2 |
| 3,854,843 A | * 12/1974 | Penny ........................ | 415/200 |
| 4,131,388 A | * 12/1978 | Brodell ..................... | 415/138 |
| 4,251,185 A | * 2/1981 | Karstensen .............. | 415/173.2 |
| 5,054,997 A | 10/1991 | Corsmeier et al. ........ | 415/173.2 |
| 5,056,988 A | 10/1991 | Corsmeier et al. ........ | 415/173.2 |
| 5,092,737 A | 3/1992 | Lau ........................... | 415/173.2 |
| 5,096,375 A | 3/1992 | Ciokailo ................... | 415/173.2 |
| 5,104,287 A | 4/1992 | Cioikajlo .................. | 415/173.2 |
| 5,160,248 A | 11/1992 | Clarke ...................... | 415/9 |
| 5,167,488 A | 12/1992 | Ciokajlo et al. ............. | 415/175 |
| 5,211,534 A | 5/1993 | Catlow ................. | 415/173.002 |
| 5,228,828 A | 7/1993 | Damlis et al. ............ | 415/173.2 |
| 5,233,822 A | 8/1993 | Ward et al. ................. | 60/39.02 |
| 5,281,085 A | 1/1994 | Lenahan et al. ............ | 415/116 |
| 5,405,227 A | * 4/1995 | His et al. .................... | 411/366 |
| 5,437,538 A | * 8/1995 | Mitchell ........................ | 415/9 |
| 5,601,402 A | 2/1997 | Wakeman et al. ........ | 415/173.2 |
| 5,871,333 A | 2/1999 | Halsey ..................... | 415/173.1 |
| 5,885,056 A | 3/1999 | Goodwin ........................ | 415/9 |
| 6,113,349 A | * 9/2000 | Bagepalli et al. ........... | 415/135 |
| 6,149,380 A | * 11/2000 | Kuzniar et al. ................. | 415/9 |
| 6,179,551 B1 | * 1/2001 | Sathianathan et al. ......... | 415/9 |
| 6,227,794 B1 | * 5/2001 | Wojtyczka et al. ............. | 415/9 |

FOREIGN PATENT DOCUMENTS

| | | | |
|---|---|---|---|
| EP | 1 083 299 | 3/2001 | |
| EP | 1 083399 | 3/2001 | |
| FR | 2540938 A | * 8/1984 | .............. 415/173.3 |
| GB | 1020900 A | * 2/1966 | .............. 415/173.3 |
| GB | 2235730 | 3/1991 | |
| GB | 2235731 | 3/1991 | |
| GB | 2238354 | 5/1991 | |
| GB | 2240818 | 8/1991 | |
| GB | 2241024 | 8/1991 | |
| GB | 2356669 | 5/2001 | |
| JP | 52-38617 A | * 3/1977 | ................. 415/126 |

* cited by examiner

*Primary Examiner*—Christopher Verdier
(74) *Attorney, Agent, or Firm*—Nathan D. Herkamp; Alfred J. Mangels

(57) ABSTRACT

A casing for the fan section of an aircraft gas turbine engine of the turbofan type. The casing includes an inner filler material and is defined by an outer shell and an inner liner that is spaced radially inwardly from the outer shell. The inner liner is held in position relative to the outer shell by a plurality of radially-inwardly-extending support pins. The pins are carried by the outer shell and are slidably received in and extend at least partially into the inner liner. The support pins retain the inner liner against axial and rotational movement relative to the outer shell, while allowing relative radial movement therebetween in response to thermal expansion and contraction, as well as in response to aircraft maneuver loads imposed on the engine.

19 Claims, 4 Drawing Sheets

FAN CASING LINER SUPPORT

BACKGROUND OF THE INVENTION

The present invention relates to aircraft turbofan engines in which an annular fan casing carries an inner, abradable liner that surrounds the fan rotor. More particularly, the present invention relates to a fan casing liner that is supported by a fan outer casing to allow radial expansion and contraction of the liner independently of radial expansion and contraction of the fan outer casing.

Aircraft gas turbine engines of the turbofan type are characterized by a relatively large diameter axial-flow fan that is positioned ahead of the relatively smaller diameter compressor of a core engine. The fan provides an initial pressure increase to the air that enters the engine air inlet and before the air enters the compressor. Because the fan has a larger diameter than that of the core engine compressor, a part of the air that exits from the fan passes around the outer periphery of the compressor and flows over Fe outer casing of the core engine. Generally, the airflow from the fan that bypasses the core engine is a considerable volume of the inlet air stream, ranging, for example, from about five to about eight times the airflow through the core engine.

Because of the large mass of bypass air that exits from the fan, and because of the higher pressure of the bypass airflow, relative to the inlet airflow, the thrust output available from turbofan engines is increased considerably for a relatively small increase in fuel consumption. Consequently, the fuel usage efficiency of such engines is greater than that of conventional turbojet engines that do not involve such a bypass arrangement. In addition, the propulsive efficiency of turbofan engines is greater than that of turbojet engines because the high mass of bypass stream airflow is discharged at a lower velocity than that of the smaller mass of air and combustion products that are discharged at a considerably higher velocity in a turbojet engine.

For high-bypass-ratio turbofan engines the radially-extending fan rotor blades are considerably longer than conventional axial-flow compressor rotor blades. And to maintain a high operating efficiency of the fan section of the engine, the clearance between the radially outermost ends of the fan blades and the inner surface of the surrounding fan casing must remain small over a wide operating range of the engine to avoid fan blade tip losses. Such losses result when a portion of the air is allowed to flow over the tips of the fan blades, rather than axially, with the result that the pressure ratio between the fan inlet and the fan outlet is diminished, resulting in decreased engine thrust.

Fan blades utilized in high-bypass-ratio turbofan engines are sometimes made from composite materials to reduce fan blade weight while maintaining blade strength and aerodynamic efficiency. Fan casings, on the other hand, are generally made from metals to provide a sufficiently strong containment structure to retain fan blades and blade fragments that might separate from the fan rotor, and to prevent them from being thrown outwardly through the fan outer casing. Composite materials of the type utilized in making fan blades have a relatively low coefficient of thermal expansion, while the metallic fan casing material, usually an aluminum alloy, has a significantly higher coefficient of thermal expansion. Accordingly, because of the differences in the thermal expansion characteristics of the fan blade and of the casing material, it is difficult to maintain the desired small blade tip clearance for highest fan aerodynamic efficiency. In that regard, the variation of blade tip clearance solely from thermal effects over the extremes of an aircraft operating envelope can be as much as 0.140 in.

Additional factors affecting blade tip clearance are the loads imposed on the fan blades during aircraft maneuvers and during times in which rapid output demands are placed on the engine. Thus, during rapid engine acceleration, or during certain aircraft maneuvers, centrifugal forces acting on the blades can cause blade elongation in a radial direction that can result in contact of the blade tips with the inner surface of the casing. Accordingly, fan casings generally include abradable materials on the inner surface of the fan casing to avoid direct contact between the fan blades and the fan casing, and to allow for removal by the fan blade tips of part of the abradable material to accommodate the differences in thermally-caused expansion and loading-caused expansion of the fan blades and of the fan outer casing.

In addition to the effects of thermal changes and aircraft maneuver load changes on fan blade length, the fan casing of a turbofan engine must be capable of withstanding the loss of a fan blade. Such a condition can occur as a result of the impact with a blade of a foreign object, such as a bird or a piece of ice that forms at the engine air inlet and that subsequently becomes dislodged from the inlet and is drawn into the fan by the inlet airflow to strike a blade. When the loss of a fan blade occurs the fan rotor becomes unbalanced, thereby imposing larger radial loads on the fan rotor bearings. Additionally, the tips of the remaining blades describe a larger diameter circle by virtue of the orbital movement of the fan rotor axis as a result of the unbalanced condition of the fan rotor. Consequently, the tips of the remaining blades dig into the abradable material, which is rigidly attached to the inner surface of the fan casing, thereby scraping away a considerable portion of the material and possibly causing blade tip contact with the metallic outer fan casing.

One way in which thermal expansion differences between the fan blade material and the fan casing material can be reduced is by extracting pressurized air from the core engine to cool the fan casing to limit its thermal expansion. But that approach adds weight to the engine, and it also reduces the airflow through the core engine, thereby reducing engine thrust output.

It is therefore desirable to provide a fan casing structure that will maintain efficient fan aerodynamic performance over a wide range of fan component operating temperatures, and that will also allow fan rotor orbiting to occur in the event of a fan rotor unbalance condition caused by the loss of a fan blade or of a portion of a fan blade.

SUMMARY OF THE INVENTION

Briefly stated, in accordance with one aspect of the present invention, a casing is provided for surrounding a rotatable member having a plurality of substantially radially extending blades. The casing includes an annular outer shell and an annular inner liner carried within and spaced inwardly of the outer shell and substantially coaxial therewith. A plurality of radially-inwardly-extending support members are carried by the outer shell and extend at least partially into the inner liner to support the inner liner against relative axial and rotational movement, and to allow relative radial movement therebetween.

BRIEF DESCRIPTION OF THE DRAWINGS

The structure, operation, and advantages of the present invention will become further apparent upon consideration of the following description, taken in conjunction with the accompanying drawings, in which.

DETAILED DESCRIPTION OF THE INVENTION

Figure 1:
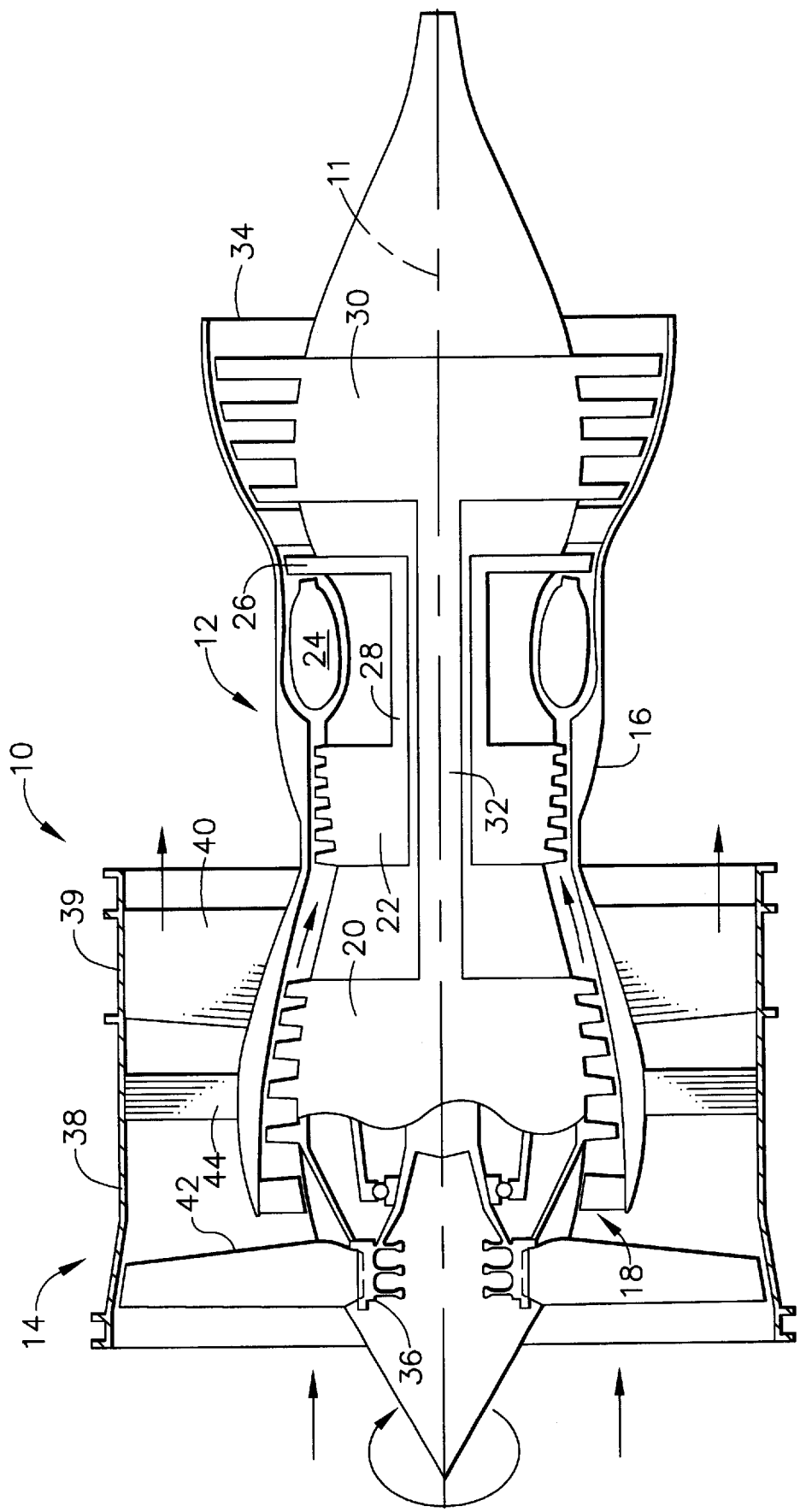
FIG. 1 is a diagrammatic, longitudinal cross-sectional view of a turbofan engine showing the arrangement of the several major components thereof.

Referring to the drawings, and particularly to FIG. 1 thereof, there is shown in diagrammatic form an aircraft turbofan engine 10 having a longitudinal axis 11 and that includes a core engine 12 and a fan section 14 positioned upstream of the core engine. Core engine 12 includes a generally tubular outer casing 16 that defines an annular core engine inlet 18 and that encloses and supports a pressure booster 20 for raising the pressure of the air that enters core engine 12 to a first pressure level. A high pressure, multi-stage, axial-flow compressor 22 receives pressurized air from booster 20 and further increases the pressure of the air. The pressurized air flows to a combustor 24 in which fuel is injected into the pressurized air stream to raise the temperature and energy level of the pressurized air. The high energy combustion products flow to a first turbine 26 for driving compressor 22 through a first drive shaft 28, and then to a second turbine 30 for driving booster 20 through a second drive shaft 32 that is coaxial with first drive shaft 28. After driving each of turbines 26 and 30, the combustion products leave core engine 12 through an exhaust nozzle 34 to provide propulsive jet thrust.

Fan section 14 includes a rotatable, axial-flow fan rotor 36 that is surrounded by an annular fan casing 38. The fan casing is supported from core engine 12 by a plurality of substantially radially-extending, circumferentially-spaced support struts 40. Fan casing 38 encloses fan rotor 36 and extends over an outer portion of core engine 12 to define a secondary, or bypass airflow conduit.

Fan rotor 36, which is also driven by second drive shaft 32, includes a plurality of radially-extending fan blades 42 (only two of which are visible in FIG. 1) that extend outwardly beyond core engine inlet 18. Preferably, fan blades 42 are formed from a strong, non-metallic, composite material, such as a plurality of reinforcing fibers that define a multi-layer woven fabric and that are embedded within a thermosetting resin matrix. Such composite materials are well known to those skilled in the art and will therefore not be further described herein.

Accordingly, fan casing 38 has a larger outer diameter than that of core engine inlet 18, and fan section 14 provides a relatively large mass of bypass airflow that is directed axially rearwardly, toward nozzle 34 by fan outlet guide vanes 44 to provide additional jet thrust for propelling an aircraft (not shown) in which engine 10 is installed. For most subsonic aircraft applications the ratio of bypass airflow to core engine airflow can be from about 5:1 to about 8:1 or more, and turbofan engines having such bypass ratios generally derive a larger portion of their output thrust from the bypass airflow stream.

For peak aerodynamic efficiency of the fan, it is important that the spacing between the outer tips of fan blades 42 and the inner cylindrical surface of fan casing 38 be as small as possible. Maintaining a minimal fan blade tip to fan casing inner surface clearance contributes to minimizing leakage airflow over the fan blade tips and to confining the air to flow from the leading edge to the tailing edge of the fan blade for most efficient fan operation by enabling the pressure ratio across the fan to be maintained at or near the desired level. However, because the fan blades are relatively long the material from which the fan blades are made is preferably a lightweight material, to reduce fan inertia and thereby improve engine response to changes in power demand. However, materials suitable for making light weight fan blades, such as composite materials, are generally unsuitable for use as the fan casing material because the fan casing must contain blades and blade fragments that separate from the fan because of foreign object damage. Accordingly, the fan casing must provide a strong blade containment structure, which generally dictates that it be a metallic material. But because metals have a higher coefficient of thermal expansion than do composite, lighter weight materials of the type generally utilized to form the fan blades, there is a significant difference in the rate and amount of thermal expansion that the composite fan blades undergo for a given temperature change, as compared with the thermal expansion of the metallic fan outer casing. As a result, the gap between the fan blade tips and the fan casing inner surface tends to increase as the temperatures of each of those elements increase.

Figure 2:
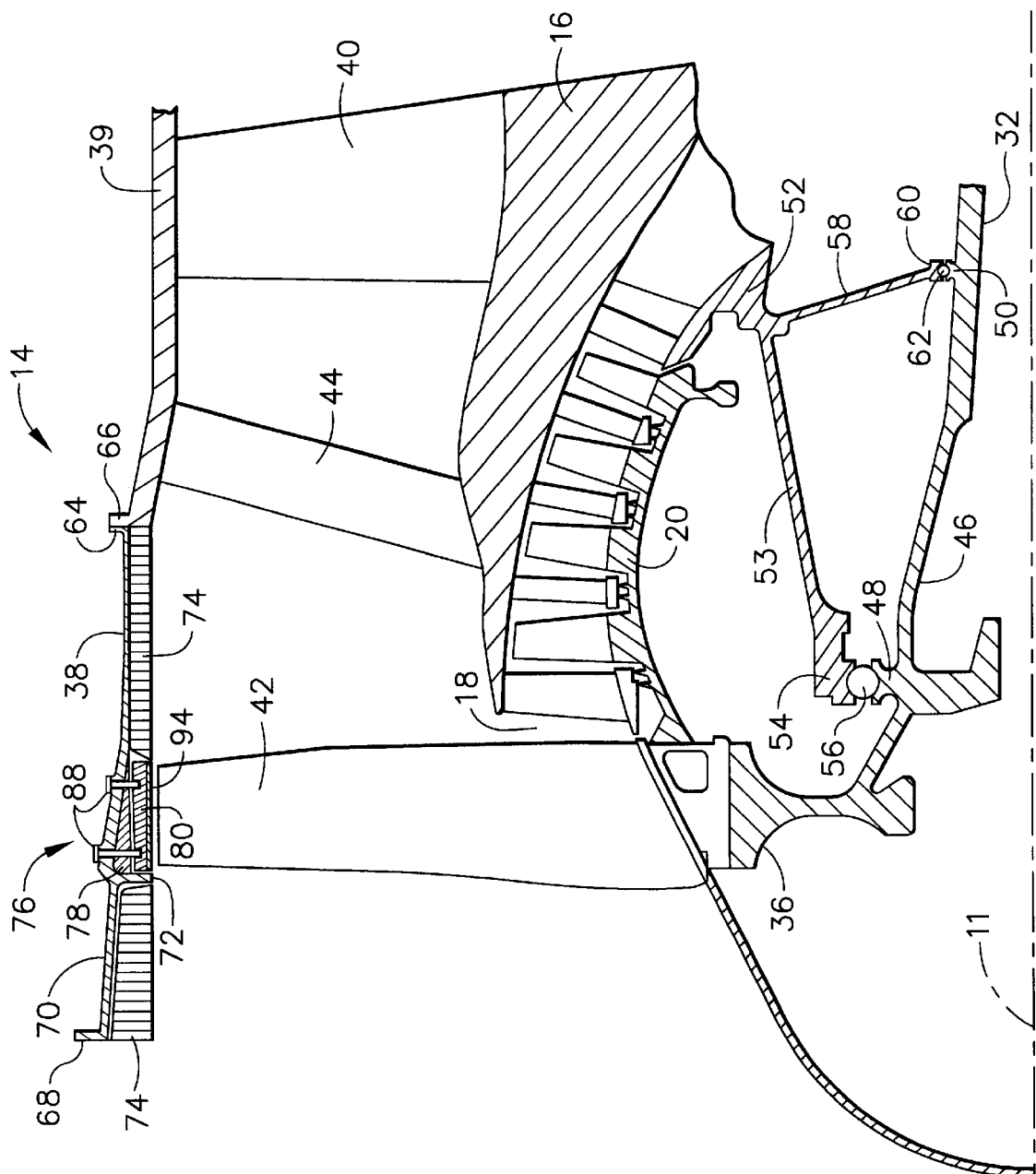
FIG. 2 is an enlarged, fragmentary, longitudinal cross-sectional view of the fan section of a turbofan engine including an embodiment of the present invention in the form of a fan casing having a fan casing inner liner that is radially movable relative to the fan outer casing.

FIG. 2 is an enlarged view of fan section 14 of engine 10 and shows an embodiment of the present invention. Fan rotor 36 is connected with second drive shaft 32 by a forwardly-diverging, frustoconical shell 46 that has a predetermined flexibility to enable fan rotor 36 to rotate about an axis that is radially offset from longitudinal centerline 11 in the event a fan rotor unbalance condition occurs. Such orbital motion of the fan rotor axis can occur as a result of a rotor unbalance condition, which results from the failure of a portion of the fan rotor support structure. Shell 46 includes a forward bearing support 48 adjacent to fan rotor 36 and a rear bearing support 50 adjacent to fan frame 52. A forwardly-converging, frustoconical bridging member 53 extends forwardly from fan frame 52 and includes a stationary forward bearing support 54 spaced radially outwardly of rotatable bearing support 48 for supporting fan front bearing 56. A transverse support wall 58 extends from fan frame 52 toward drive shaft 32 and carries a stationary rear fan bearing support 60 positioned radially outwardly of rear bearing support 50 for supporting fan rear bearing 62. Thus, if a fan rotor unbalance condition occurs, forward bearing support 54 of bridging member 53 can deflect radially outwardly, relative to longitudinal axis 11, or it can fail, while fan rotor 36 continues to rotate. In that event, fan rotor 36 will orbit about its original axis of rotation, and the radius of that orbit will be the result of the rotor's new mass center. Thus, the fan axis of rotation will orbit about engine longitudinal centerline 11 in response to the fan rotor unbalance condition, and that orbital motion will thereby reduce the load that would otherwise be imparted to the engine bearings and bearing supports carried by the engine frame members.

The outer casing of fan section 14 includes a fan casing 38 and a fan outlet duct casing 39. Casings 38 and 39 are generally annular structures that have respective end flanges 64, 66 that are bolted together by a plurality of circumferentially-disposed bolts (not shown) to define the fan outer casing. Duct casing 39 surrounds a portion of pressure booster 20 and is supported by a plurality of substantially radial struts 40 that extend outwardly from fan frame 52. Fan casing 38 includes a forward flange 68 for connection of the casing with an engine nacelle (not shown). A first, frustoconical fan inlet section 70 tapers axially inwardly from front flange 68 and includes an inwardly-extending wall 72 that terminates inwardly adjacent a circle defined by the fan blade outer tips. Wall 72 defines a step for blocking forward movement of fan blades or fan blade fragments that have separated from the fan rotor as a result of foreign object damage. An acoustically absorbent material 74 is carried on the inner surface of fan inlet section 70 to attenuate engine inlet noise.

A second section 76 of fan casing 38 is positioned immediately downstream of fan inlet section 70. Sections 70 and 76 together define fan casing 38. Fan case section 76 also includes an inner filler material 78 that can be a composite material, such as that from which the fan blades are formed, or it can be a honeycomb material, such as aluminum honeycomb 5056, having a ⅛ in. cell size, and a 0.0015 in. wall thickness. Filler material 78 can be bonded to the inner surface of fan casing blade section 76, if desired. The innermost surface of filler material 78 is spaced radially outwardly of the circle described by the fan blade tips. Immediately downstream of fan case section 76 is fan outlet duct 39, which optionally can also include an inner layer (not shown) of acoustically-absorbent material for additional noise suppression.

Figure 3:
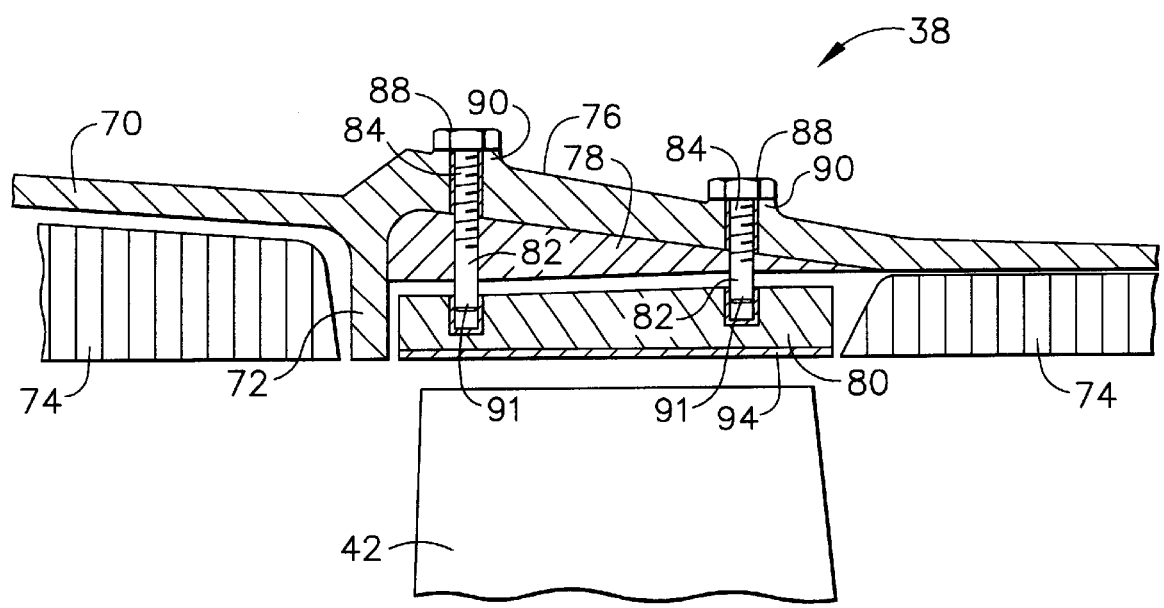
FIG. 3 is an enlarged, fragmentary, longitudinal cross-sectional view of the fan outer casing and inner liner shown in FIG. 2.

The structure of section 76 of fan casing 38 is shown in enlarged detail in FIG. 3. As shown, composite material 78 is adherently bonded to the inner surface of fan casing section 76. The filler material merely fills the space that will be traversed by the blade tips of an unbalanced rotor, to allow the rotor to orbit without the blade tips contacting the rigid outer shell defined by fan casing section 76. Thus, the filler material is intended to be destroyed, and it is destroyed when a fan rotor unbalance condition occurs. Consequently, any readily frangible material, preferably a light weight material, can be utilized as filler material 78.

Positioned radially inwardly of and spaced from filler material 78 is an inner ring 80 that is preferably formed from a material that has a coefficient of thermal expansion substantially the same as that of the fan blade material. Thus, inner ring 80 can be formed from the same material as the composite material from which the fan blades are formed. Inner ring 80 is positioned radially inwardly of the innermost surface of filler material 78 and is spaced therefrom by a distance of from about 3 mm. to about 7 mm. Additionally, inner ring 80 is so positioned within section 76 of the fan casing to, in effect, be capable of radial expansion and contraction between filler material 78 and the tips of fan blades 42.

Inner ring 80 is held in position by a plurality of radially-extending support pins 82 that have at least a partially threaded shank 84. Pins 82 can be threadedly received in threaded openings 86 provided in the casing defining section 76, or, if desired, internally threaded sleeves 87 can be provided in casing section 76, as more clearly shown in the enlarged view of FIG. 4. Support pins 82 include a head end 88 that rests against a boss 90 provided on the outer surface of fan case section 76. Shank 84 of support pin 82 can include an unthreaded end portion 91, opposite from head end 88, and end portion 91 is adapted to extend into inner ring 80 to retain the inner ring in a predetermined axial and circumferential position within fan casing 38. Pins 82 also serve to restrain inner ring 80 from rotational movement relative to fan casing 38.

As few as three equally circumferentially spaced support pins 82 can be provided to support inner ring 80, although as many as eight or more such support pins can be utilized, if desired. Further, although a single circumferential row of support pins 82 can be provided when the fan blades have a relatively short axial dimension, of the order of from about 7 cm to about 14 cm, plural, axially-spaced rows can also be provided. In that regard, the axial dimension of the fan blades will normally dictate the axial extent of inner ring 80. Additionally, if plural rows of support pins are provided, the pins in one row can be circumferentially offset from the pins in an adjacent row to increase the center-to-center spacing between adjacent support pins.

Figure 4:
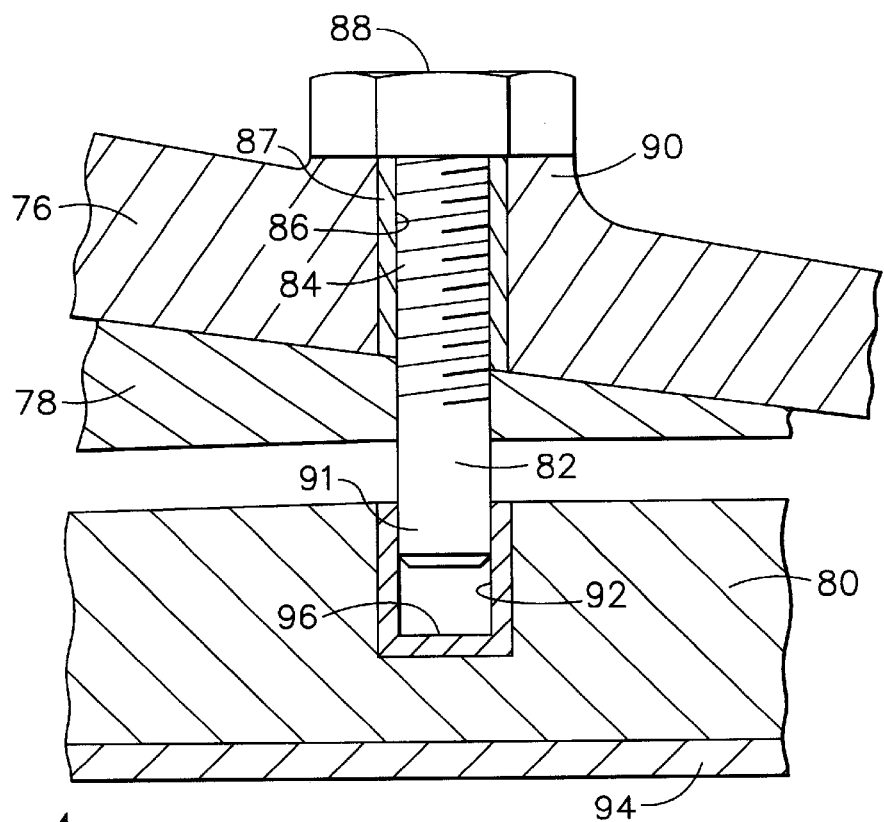
FIG. 4 is an enlarged, fragmentary, longitudinal cross-sectional view showing the interconnection of inner liner support pins that extend inwardly from the fan outer casing to support the inner liner of the fan casing shown in FIG. 3.
Figure 5:
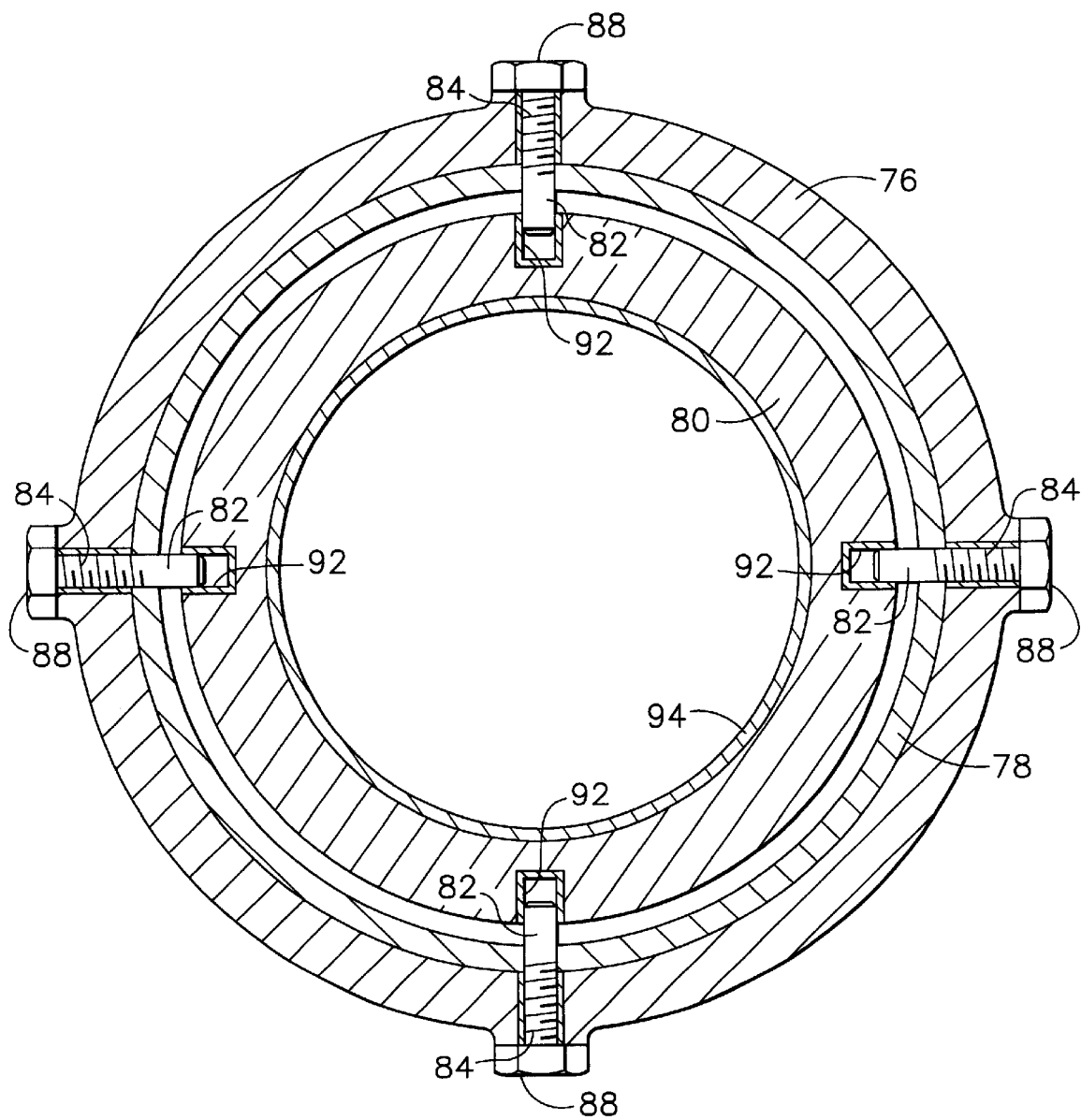
FIG. 5 is a transverse cross-sectional view of the fan outer casing and the fan casing inner liner shown in FIG. 3.

As best seen in FIGS. 4 and 5, support pins 82 are preferably received in inner ring 80 in respective tubular sleeves 92 that are securely radially carried in the inner ring. Sleeves 92 can be metallic members to provide bearing surfaces for the smaller diameter pins and thereby reduce the tendency of the pins to displace inner ring material as the engine undergoes maneuvers that impose axially- or tangentially-directed loads on the inner ring.

As also seen in FIGS. 3, 4, and 5, inner ring 80 can have an inner layer 94 of abradable material, to allow blade contact with and to abrade material therefrom without damaging the composite base material that provides the structural strength of inner ring 80. Although sleeve 92 can be an open-ended tubular member, as shown in FIG. 4, the sleeve can have a transverse inner end 96 that is spaced from the innermost end of support pin 82 by a sufficient distance when the parts are assembled, to allow for outward radial thermal expansion or load-induced movement of inner ring 80 and to prevent bottoming of an end of a support pin 82 within a sleeve 92. Preferably, the cross-sectional size and shape of support pins 82 correspond substantially with those of sleeves 92, and they are selected to allow free sliding movement of pins 82 within sleeves 92, in a radial direction relative to engine longitudinal axis 11. Finally, the pins can be formed from a metallic material, if desired, or they can be formed from a composite material that can be the same material as that from which the fan blades are formed, or they can be formed from another material that has sufficient strength to support inner ring 80 during anticipated engine operating conditions. If made from a suitable material having strength characteristics similar to those of the fan blade material, the fan blades can fracture the support members when the fan rotor undergoes orbital movements, to avoid additional fan blade damage as a result of orbital motion of the fan rotor.

In operation, inner ring 80 is held in coaxial relationship with longitudinal axis 11 of fan rotor 36 by virtue of the retentive forces provided by the several circumferentially positioned support pins 82. In essence, the radial support pins, when properly radially oriented, provide a self-centering arrangement for inner ring 80. If the fan rotor is subjected to maneuvering forces that cause the blades to expand radially, or that cause the fan rotor to deflect slightly from its normal axial position, the abradable material on the innermost surface of inner ring 80 will be abraded away to allow the fan blades to contact the inner ring without causing damage to the blades. If a sufficiently large unbalance condition occurs, and the abradable material is substantially completely abraded away, the blades can dig into the inner ring material and cause the ring support pins to shear while the fan rotor orbits about its original axis of rotation, until its rotation can be slowed.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A casing for surrounding a rotatable turbomachine member that includes a rotor and a plurality of substantially radially-extending, circumferentially spaced rotor blades, said casing comprising:
   a. an annular outer shell formed from a material having a first coefficient of thermal expansion;
   b. an annular inner liner carried within and spaced radially inwardly of the outer shell and substantially coaxial therewith, the annular inner liner formed from a material having a second coefficient of thermal expansion that is lower than the first coefficient of thermal expansion and capable of radially expanding and radially contracting relative to the outer shell as a result of changes in inner liner temperature, the annular liner surrounding and spaced radially outwardly from outer tips of the rotor blades by a predetermined distance to limit gas flow between the rotor blade tips and the inner liner;
   c. a plurality of substantially radially inwardly extending support members fixedly carried by the outer shell and extending at least partially into substantially radial openings carried by the inner liner to support the inner liner against axial and rotational movement relative to the outer shell, and to allow relative radial sliding movement between the outer shell and the inner liner along the support members and without relative rotation between the support members and the inner liner.

2. A casing in accordance with claim 1, wherein the outer shell is a metallic structure that has sufficient rigidity to contain separated fragments of the rotatable member.

3. A casing in accordance with claim 1, wherein the outer shell includes an impact-energy-absorbing annular intermediate layer positioned between the outer shell and the inner liner.

4. A casing in accordance with claim 3, wherein the intermediate layer includes a metallic honeycomb material.

5. A casing in accordance with claim 3, wherein the intermediate layer is secured to the outer shell and is spaced from the inner liner.

6. A casing in accordance with claim 5, wherein the intermediate layer is adhesively bonded to the outer shell.

7. A casing in accordance with claim 1, wherein the outer shell includes a radially-inwardly-extending step for retaining separated fragments of the rotatable member.

8. A casing in accordance with claim 1, wherein the coefficient of thermal expansion of the inner liner is substantially the same as that of the rotor blades.

9. A casing in accordance with claim 1, wherein the inner liner includes a composite material.

10. A casing in accordance with claim 9, wherein the composite material is the same material as the rotor blade material.

11. A casing in accordance with claim 1, wherein the inner liner includes a metallic honeycomb material.

12. A casing in accordance with claim 1, wherein the inner liner includes a radially-inwardly-facing surface formed by a layer of abradable material.

13. A casing in accordance with claim 1, wherein the support members include support pins that are slidably received in the inner liner.

14. A casing in accordance with claim 13, wherein the support pins are threadedly carried by the outer shell.

15. A casing in accordance with claim 14, wherein the inner liner includes a plurality of radially-inwardly-extending tubular sleeves that slidably receive respective support pins.

16. A casing in accordance with claim 14, wherein the support pins are provided in a single row of circumferentially-spaced support pins.

17. A casing in accordance with claim 14, wherein the support pins are provided in plural, axially-spaced rows of circumferentially-spaced support pins.

18. A casing in accordance with claim 1, wherein the support members are formed from a composite material.

19. A fan casing for surrounding a rotatable fan having a plurality of substantially radially-outwardly-extending blades, said casing comprising:
   a. an annular outer shell;
   b. an annular inner liner freely carried within and spaced radially inwardly of the outer shell and substantially coaxial therewith, wherein the inner liner is formed from a composite material having a coefficient of thermal expansion that is lower than the coefficient of thermal expansion of the outer shell, and capable of radially expanding and radially contracting relative to the outer shell as a result of changes in inner liner temperature, the annular liner surrounding and spaced radially outwardly from outer tips of the rotor blades by a predetermined distance to limit gas flow between tips of the rotor blade and the inner liner; and
   c. a plurality of substantially radially inwardly extending support pins fixedly carried by the outer shell and extending at least partially into a plurality of radially-inwardly-extending openings carried by the inner liner to support the inner liner against axial and rotational movement relative to the outer shell, and to allow relative radial movement between the outer shell and the inner liner along the support pins and without relative rotation between the support pins and the inner liner.

* * * * *